(12) United States Patent (10) Patent No.: US 11,777,647 B2
Kim et al. (45) Date of Patent: Oct. 3, 2023

(54) METHOD AND APPARATUS FOR TRAFFIC TRANSMISSION IN COMMUNICATION SYSTEM

(71) Applicant: ELECTRONICS AND TELECOMMUNICATIONS RESEARCH INSTITUTE, Daejeon (KR)

(72) Inventors: Seok Ki Kim, Daejeon (KR); Ok Sun Park, Daejeon (KR); Gi Yoon Park, Daejeon (KR); Eun Jeong Shin, Daejeon (KR); Jae Sheung Shin, Daejeon (KR); Jin Ho Choi, Vic (AU)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/747,298

(22) Filed: May 18, 2022

(65) Prior Publication Data

US 2023/0006767 A1 Jan. 5, 2023

(30) Foreign Application Priority Data

Jun. 30, 2021 (KR) .................. 10-2021-0085740
May 9, 2022 (KR) .................. 10-2022-0056470

(51) Int. Cl.
*H04L 1/00* (2006.01)
*H04L 5/00* (2006.01)

(52) U.S. Cl.
CPC .......... *H04L 1/0057* (2013.01); *H04L 1/0041* (2013.01); *H04L 5/0048* (2013.01)

(58) Field of Classification Search
CPC ... H04L 1/0041; H04L 1/0057; H04L 1/0061; H04L 1/0071; H04L 5/0048
See application file for complete search history.

(56) References Cited

U.S. PATENT DOCUMENTS 8,462,676 B2 6/2013 Ahmadi
9,054,849 B2 6/2015 Myung et al.
(Continued)

FOREIGN PATENT DOCUMENTS

WO 2020-096330 A1 5/2020
WO 2020/149595 A1 7/2020

*Primary Examiner* — Shelly A Chase
(74) *Attorney, Agent, or Firm* — LRK PATENT LAW FIRM

(57) ABSTRACT

An operation method of a terminal may include: receiving, from a base station, an addition value $K_N$, information on linear combination coefficient matrices for respective numbers of transport blocks, and configuration information on each linear combination coefficient matrix; dividing a source block into M transport blocks; selecting one linear combination coefficient matrix among the linear combination coefficient matrices based on M; generating $(M+K_N)$ network coding blocks by performing network coding on the M transport blocks with the selected one linear combination coefficient matrix; and transmitting, to the base station, messages each including one network coding block among the network coding blocks, a control index of the one linear combination coefficient matrix, and a preamble.

15 Claims, 16 Drawing Sheets

(56) References Cited

U.S. PATENT DOCUMENTS

| | | |
|---|---|---|
| 9,119,074 B2 | 8/2015 | Tavildar et al. |
| 9,185,529 B2 | 11/2015 | Medard et al. |
| 2015/0139227 A1 | 5/2015 | Kim et al. |
| 2019/0253101 A1 | 8/2019 | Kilian et al. |
| 2020/0153488 A1* | 5/2020 | Wu .................... H04B 7/0689 |
| 2020/0275483 A1 | 8/2020 | Li et al. |
| 2021/0007127 A1 | 1/2021 | Hwang et al. |
| 2021/0100036 A1 | 4/2021 | Kim et al. |
| 2021/0351828 A1* | 11/2021 | Gao .................... H04B 7/0634 |
| 2021/0360610 A1 | 11/2021 | Kim et al. |
| 2022/0029686 A1* | 1/2022 | Hao ....................... H04B 7/10 |
| 2022/0124815 A1 | 4/2022 | Kim |

\* cited by examiner

METHOD AND APPARATUS FOR TRAFFIC TRANSMISSION IN COMMUNICATION SYSTEM

CROSS-REFERENCE TO RELATED APPLICATIONS

This application claims priority to Korean Patent Applications No. 10-2021-0085740 filed on Jun. 30, 2021, and No. 10-2022-0056470 filed on May 9, 2022 with the Korean Intellectual Property Office (KIPO), the entire contents of which are hereby incorporated by reference.

BACKGROUND

1. Technical Field

The present disclosure relates to a technique for traffic transmission in a communication system, and more particularly, to a technique for traffic transmission in a communication system, which can redundantly transmit a plurality of packets in combination when a large number of devices transmit the plurality of packets.

2. Description of Related Art

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The NR communication system may support a frequency band of 6 GHz or higher as well as a frequency band of 6 GHz or less, and may support various communication services and scenarios compared to the LTE communication system. For example, usage scenarios of the NR communication system may include enhanced Mobile BroadBand (eMBB), Ultra-Reliable Low-Latency Communication (URLLC), massive Machine Type Communication (mMTC), and the like.

The mMTC and URLLC, which are major service scenarios of the 5th generation mobile communication system, are essential technologies for building factory automation solutions such as ultra-precise motion control of production robots, monitoring and real-time control of production processes using multiple sensors, and detection and control through remote robots. The 5G NR communication system may use a two-step grant-free random access (GFRA) procedure instead of the existing four-step random access procedure for large-scale device access and low-latency transmission. According to the GFRA scheme, a large number of devices can transmit data packets each of which is concatenated with a preamble by preconfiguring radio resources for data transmission. In this case, the radio resources for data that a large number of devices can transmit may be limited. For this reason, the GFRA scheme may be limitedly applied to short-length packet transmission.

In such the 5G NR communication system, as the length of a packet increases, the number of random access attempts by each device may increase. Accordingly, a possibility of collision due to simultaneous access attempts of a large number of devices may further increase. Therefore, when a large number of devices transmit long-length packets, a random access method capable of increasing reliability and reducing latency may be required.

SUMMARY

In order to solve the above-identified problems, exemplary embodiments of the present disclosure are directed to providing a method and an apparatus for traffic transmission in a communication system, which can redundantly transmit a plurality of packets in combination when a large number of devices transmit the plurality of packets.

According to a first exemplary embodiment of the present disclosure for achieving the above-described objective, an operation method of a terminal may comprise: receiving, from a base station, an addition value $K_N$, information on linear combination coefficient matrices for respective numbers of transport blocks, and configuration information on each linear combination coefficient matrix; dividing a source block into M transport blocks; selecting one linear combination coefficient matrix among the linear combination coefficient matrices based on M; generating $(M+K_N)$ network coding blocks by performing network coding on the M transport blocks with the selected one linear combination coefficient matrix; and transmitting, to the base station, messages each including one network coding block among the network coding blocks, a control index of the one linear combination coefficient matrix, and a preamble, wherein each of $K_N$ and M is a natural number.

The operation method may further comprise, after the dividing of the source block into M transport blocks, generating a forward error correction (FEC) code for each of the M transport blocks; and attaching the FEC code to each of the M transport blocks, wherein the network cording is performed on the M transport blocks to which the FEC codes are respectively attached.

The operation method may further comprise, after the generating of $(M+K_N)$ network coding blocks, generating an FEC code for each of the $(M+K_N)$ network coding blocks; and attaching the FEC code to each of the $(M+K_N)$ network coding blocks, wherein the messages include the one network coding block among the network coding blocks to which the FEC codes are respectively attached.

An S-th network coding block $Y_S$ among the $(M+K_N)$ network coding blocks may be defined as $\Sigma_{m=1}^{M} g_m X_m$, where $1 \leq S \leq (M+K_N)$, $X_m$ is an m-th transport block among the M transport blocks, and $g_m$ is a linear combination coefficient of a linear combination coefficient matrix applied to the m-th transport block when the M transport blocks are linearly combined into the S-th network coding block.

The operation method may further comprise, before the dividing of the source block into M transport blocks, receiving, from the base station, information on a size W of a sliding window, wherein the sliding window is used to generate $(M-W+1)$ transport block sets each comprising W transport blocks among the M transport blocks, and W is a natural number.

The operation method may further comprise, after the dividing of the source block into M transport blocks, generating the $(M-W+1)$ transport block sets each comprising the W transport blocks using the slide window for the M transport blocks, wherein the $(M+K_N)$ network coding blocks are generated using the transport block sets.

According to a second exemplary embodiment of the present disclosure for achieving the above-described objective, an operation method of a base station may comprise:

transmitting, to a terminal, an addition value $K_N$, information on linear combination coefficient matrices for respective numbers of transport blocks, and configuration information on each linear combination coefficient matrix; receiving, from the terminal, messages each including one network coding block among $(M+K_N)$ network coding blocks, a control index of one linear combination coefficient matrix, and a preamble, generating M transport blocks from the messages by estimating a number of transport blocks and a linear combination coefficient matrix based on the control index; and generating a source block by concatenating the M transport blocks, wherein each of $K_N$ and M is a natural number.

The generating of the M transport blocks may comprise: obtaining respective control indexes and respective network coding blocks from the messages; estimating respective numbers of transport blocks and respective linear combination coefficient matrixes corresponding to respective network coding blocks from the respective control indexes; and generating the M transport blocks from the messages by applying the respective number of transport blocks and the respective linear combination coefficient matrixes to the respective network coding blocks.

The operation method may further comprise, before the generating of the source block, obtaining a forward error correction (FEC) code in each of the M transport blocks; and performing error correction by applying the FEC code to each of the M transport blocks.

The operation method may further comprise, after the receiving of the messages, obtaining an FEC code for the one network coding block; and performing error correction by applying the FEC code to the one network coding block.

The addition value $K_N$ may be determined according to a link quality.

According to a third exemplary embodiment of the present disclosure for achieving the above-described objective, a terminal may comprise: a processor; a memory electronically communicating with the processor; and instructions stored in the memory, wherein when executed by the processor, the instructions cause the terminal to: receive, from a base station, an addition value $K_N$, information on linear combination coefficient matrices for respective numbers of transport blocks, and configuration information on each linear combination coefficient matrix; divide a source block into M transport blocks; select one linear combination coefficient matrix among the linear combination coefficient matrices based on M; generate $(M+K_N)$ network coding blocks by performing network coding on the M transport blocks with the selected one linear combination coefficient matrix; and transmit, to the base station, messages each including one network coding block among the network coding blocks, a control index of the one linear combination coefficient matrix, and a preamble, wherein each of $K_N$ and M is a natural number.

An S-th network coding block $Y_S$ among the $(M+K_N)$ network coding blocks may be defined as $\sum_{m=1}^{M} g_m X_m$, where $1 \le S \le (M+K_N)$, $X_m$ is an m-th transport block among the M transport blocks, and $g_m$ is a linear combination coefficient of a linear combination coefficient matrix applied to the m-th transport block when the M transport blocks are linearly combined into the S-th network coding block.

The instructions may further cause the terminal to, before the dividing of the source block into M transport blocks, receive, from the base station, information on a size W of a sliding window, wherein the sliding window is used to generate (M−W+1) transport block sets each comprising W transport blocks among the M transport blocks, and W is a natural number.

The instructions may further cause the terminal to, after the dividing of the source block into M transport blocks, generate the (M−W+1) transport block sets each comprising the W transport blocks using the slide window for the M transport blocks, wherein the $(M+K_N)$ network coding blocks are generated using the transport block sets.

According to the present disclosure, a terminal can divide a long-length packet into a plurality of transport blocks, and combine and transmit the plurality of transport blocks by using network coding. In addition, according to the present disclosure, a base station may set the number of transport blocks combined by network coding to the terminal in consideration of a network state and a link quality state. Accordingly, the terminal can generate a network coding block according to the number of transport blocks set by the base station and transmit it to the base station, thereby improving reliability. In addition, according to the present disclosure, the base station may configure a sliding window to the terminal. Accordingly, the terminal may transmit network-coded transport blocks to the base station by applying network coding to transport blocks included in the configured sliding window. As described above, according to the present disclosure, the base station can configured the sliding window to the terminal, and the terminal can sequentially combine transport blocks by network coding based on the configured sliding window and transmit a network coding block to the base station, thereby reducing a delay time of transmission and reception processing.

DETAILED DESCRIPTION OF THE EMBODIMENTS

Figure 1:
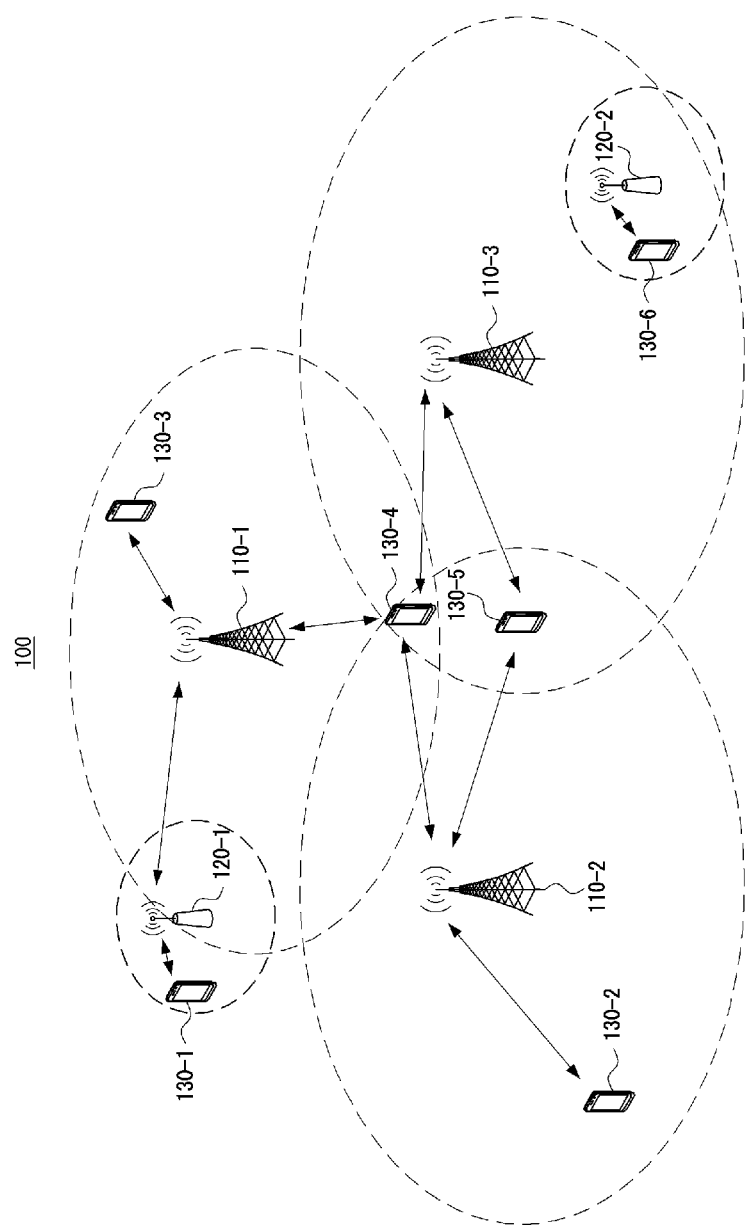
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
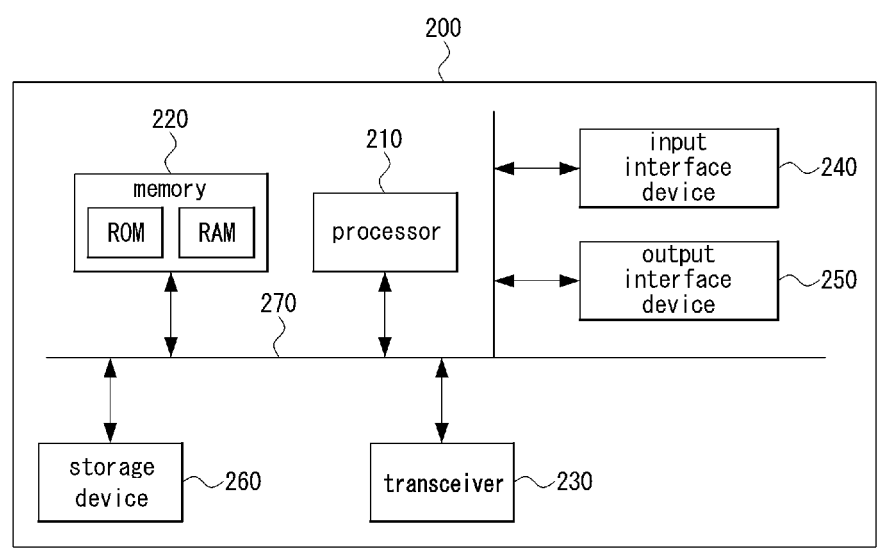
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

The mMTC and URLLC, which are major service scenarios of the 5th generation mobile communication system, are essential technologies for building factory automation solutions such as ultra-precise motion control of production robots, monitoring and real-time control of production processes using multiple sensors, and detection and control through remote robots. The 5G NR communication system may use a two-step grant-free random access (GFRA) procedure instead of the existing four-step random access procedure for large-scale device access and low-latency transmission. According to the GFRA scheme, a large number of devices can transmit data packets each of which is concatenated with a preamble by preconfiguring radio resources for data transmission. In this case, the radio resources for data that a large number of devices can transmit may be limited. For this reason, the GFRA scheme may be limitedly applied to short-length packet transmission.

Figure 3:
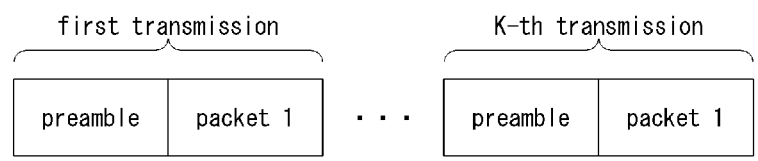
FIG. 3 is a conceptual diagram illustrating a first exemplary embodiment of a data transmission method based on a grant-free random access scheme.

FIG. 3 is a conceptual diagram illustrating a first exemplary embodiment of a data transmission method based on a grant-free random access scheme.

Referring to FIG. 3, in a grant-free random access scheme-based data transmission method, a terminal may concatenate a preamble to a packet (i.e., data) and transmit it repeatedly K times. As such, in the grant-free random access scheme-based data transmission method, the terminal may improve reliability by concatenating a preamble to a packet and transmitting it to a base station repeatedly K times. In this case, the reliability may be determined by an error probability of the data and a collision probability of the preamble. In order to reduce the probability of collision of preambles in a process where a large number of terminals simultaneously attempt to access the base station, each terminal may randomly select a preamble sequence for repeated transmissions.

Meanwhile, the terminal may transmit a packet having a length longer than a packet length transmittable in a data radio resource allocated for GFRA transmission. In this case, the terminal may divide the long-length packet into transmittable short-length packets and transmit them to the base station based on the GFRA scheme.

Figure 4:
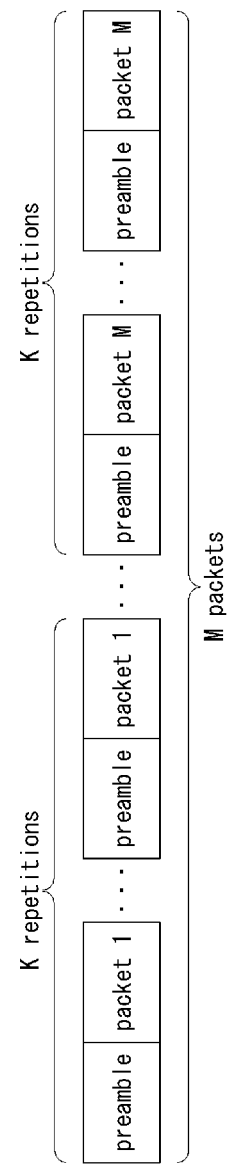
FIG. 4 is a conceptual diagram illustrating a second exemplary embodiment of a data transmission method based on a grant-free random access scheme.

FIG. 4 is a conceptual diagram illustrating a second exemplary embodiment of a data transmission method based on a grant-free random access scheme.

Referring to FIG. 4, in a grant-free random access scheme-based data transmission method, a terminal may divide a long-length packet into M short-length packets. Then, the terminal may concatenate a preamble to each of the divided M packets and repeatedly transmit it to a base station repeatedly K times. Accordingly, the terminal may attempt K×M random accesses to the base station.

In such the 5G NR communication system, as the length of a packet increases, the number of random access attempts by each device may increase. Accordingly, a possibility of collision due to simultaneous access attempts of a large number of devices may further increase. Therefore, when a large number of devices transmit long-length packets, a random access method capable of increasing reliability and reducing latency may be required.

In this regard, when a router, which is one of network components, transmits a plurality of packets, the reliability or resource efficiency may be increased by applying network coding to combine the plurality of packets and transmit them redundantly. Accordingly, the present disclosure proposes a method and an apparatus for traffic transmission in a communication system, which can redundantly transmit a plurality of packets in combination when a large number of devices transmit the plurality of packets.

Figure 5:
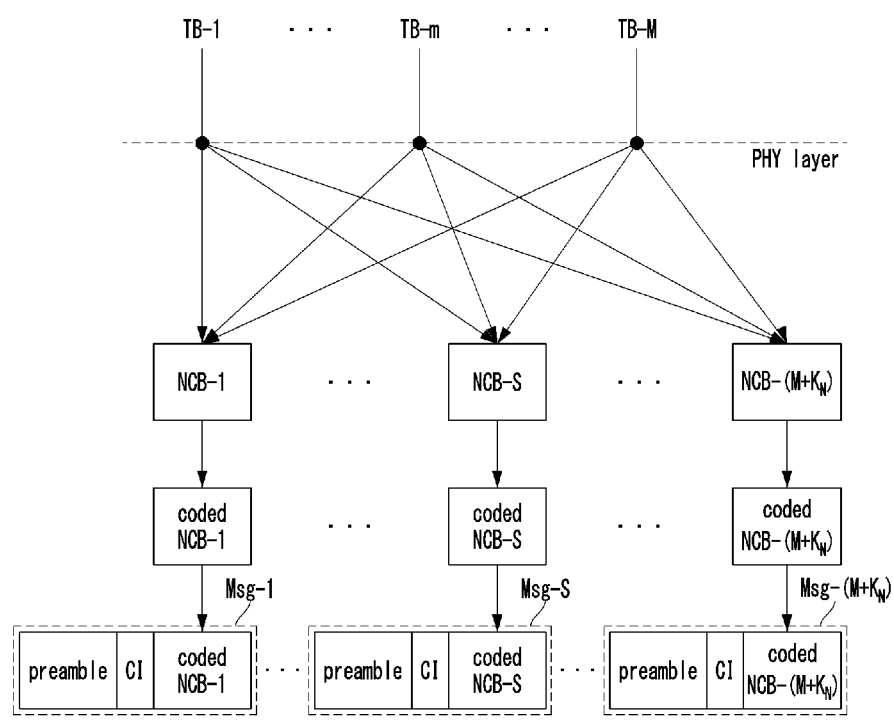
FIG. 5 is a conceptual diagram illustrating a first exemplary embodiment of a data transmission method based on a network coding grant-free random access scheme.

FIG. 5 is a conceptual diagram illustrating a first exemplary embodiment of a data transmission method based on a network coding grant-free random access scheme.

Referring to FIG. 5, in a network coding grant-free random access scheme-based data transmission method, a higher layer of a terminal may divide a long-length source block into M transport blocks (TBs) (e.g., TB-1 to TB-M) each having a length transmittable in a pre-allocated radio resource. Here, M may be a natural number. Then, the higher layer of the terminal may deliver the M transport blocks to a physical layer.

Meanwhile, the physical layer of the terminal may generate $(M+K_N)$ network coding blocks (i.e., NCB-1 to NCB-$(M+K_N)$) by performing network coding on the M transport blocks. Here, $K_N$ may be a natural number as an addition value for determining the number of network coding blocks. The base station may set the addition value $K_N$ for the terminal through system information or a higher layer message in consideration of a network state, a link quality, and/or the like. In this case, the base station may set $K_N$ for the terminal to 0 if the link quality is good. When $K_N$ is set to 0, the terminal may attempt M GFRAs to the base station by using M network coding blocks, which has the same number as the M transport blocks. On the other hand, if the link quality is poor, the base station may set the addition value $K_N$ having a large value (e.g., 6 or more) for the terminal. As such, if the addition value $K_N$ is set to a large value, the terminal may attempt the GFRA to the base station up to $(M+K_N)$ times until the M transport blocks are successfully received at the base station.

When the S-th network coding block among the $(M+K_N)$ network coding blocks is expressed as $Y_S$, it may be as in Equation 1. Here, S may be a natural number.

$$Y_S = \sum_{m=1}^{M} g_m X_m, \quad 1 \leq S \leq (M + K_N) \quad \text{[Equation 1]}$$

Here, $X_m$ may denote the m-th transport block among the M transport blocks. $g_m$ may be a linear combination coefficient applied to the m-th transport block when the M transport blocks are linearly combined into the network coding block. $g_m$ may be a value randomly selected from a Galois field GF(q) of a size q. Here, q may be 0 or a positive integer. Here, m may be a natural number.

In this case, description on the Galois field may be as follows. When F is a finite field, the number of elements of F may be expressed in a form of $q=p^n$ for a certain prime number p and a natural number n. Conversely, for the prime number p and the natural number n, there may be only one finite field with $p^n$ elements. This finite field may be called the Galois field and may be expressed as $GF(p^n)$. For example, GF(2) may be a Galois field matrix composed of elements 0 or 1. GF(256) may be a Galois field matrix composed of elements each having a value from 0 to 255.

Meanwhile, the base station may transmit, to the terminal, configuration information of a control information table such as Table 1 including control index information, transport block number information, link quality information, and linear combination coefficient matrix information. Here, a linear combination coefficient matrix may be a Galois field matrix.

TABLE 1

| Control index | Number of transport blocks | Link quality | Linear combination coefficient matrix ($[g_1\ g_2\ \ldots\ g_M]$, q = 2) |
|---|---|---|---|
| 0 | M = 2 | Q1 | [1 1] |
| 1 | M = 2 | Q2 | [1 0] |
| 2 | M = 2 | Q2 | [0 1] |

TABLE 1-continued

| Control index | Number of transport blocks | Link quality | Linear combination coefficient matrix ($[g_1\ g_2\ \cdots\ g_M]$, q = 2) |
|---|---|---|---|
| 3 | M = 3 | Q1 | [1 1 1] |
| 4 | M = 3 | Q1 | [1 0 1] |
| 5 | M = 3 | Q1 | [0 1 1] |
| . | . | . | . |
| . | . | . | . |
| . | . | . | . |

Then, the terminal may receive the control information table from the base station. In addition, the terminal may select a linear combination coefficient matrix based on the number of transport blocks and link quality in the control information table to generate the S-th network coding block. Then, the terminal may generate the S-th network coding block according to Equation 1 by using the M transport blocks and linear combination coefficients of the selected linear combination coefficient matrix.

Thereafter, the physical layer of the terminal may perform forward error correction (FEC) coding on each of the network coding blocks to generate network coding blocks to which FEC codes are respectively attached (hereinafter, referred to as 'coded network coding blocks (e.g., coded NCB-1 to coded NCB-(M+$K_N$))). Here, the FEC code may be an error correction code that enables not only error detection but also error correction by adding a larger number of redundant bits compared to an automatic repeat request (ARQ) scheme. In this case, as the FEC code, a hamming code, a cyclic redundancy check (CRC) code, a Bose-Chaudhuri-Hocquenghem (BCH) code, or the like may be used.

Then, the physical layer of the terminal may concatenate each control information (CI) to each of the coded network coding blocks. Here, each control information may be a control index indicating the linear combination coefficient matrix used in Table 1 when the terminal generates the corresponding network coding block. In addition, after concatenating the CI to each of the coded network coding blocks, the physical layer of the terminal may concatenate each preamble to generate each message (e.g., Msg1 to Msg-(M+$K_N$)). In this case, the physical layer of the terminal may randomly select a preamble sequence of each preamble.

The physical layer of the terminal may transmit the generated messages to the base station. In this manner, the physical layer of the terminal may transmit the messages (e.g., Msg1 to Msg-(M+$K_N$)) to the base station to attempt (M+$K_N$) GFRA transmissions.

Figure 6:
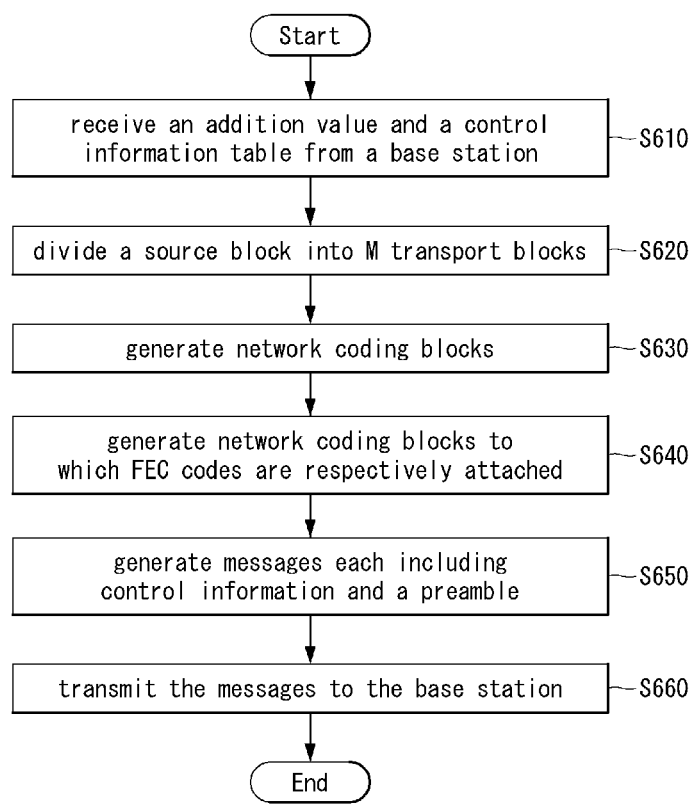
FIG. 6 is a flowchart for describing the first exemplary embodiment of the network coding grant-free random access scheme-based data transmission method.

FIG. 6 is a flowchart for describing the first exemplary embodiment of the network coding grant-free random access scheme-based data transmission method.

Referring to FIG. 6, in the network coding grant-free random access scheme-based data transmission method, the base station may inform the terminal of the addition value $K_N$ for calculating the number of network coding blocks through system information or a higher layer message. Then, the terminal may receive the addition value $K_N$ for calculating the number of network coding blocks from the base station (S610).

Meanwhile, the base station may transmit the control information table such as Table 1 including control index information, transport block number information, link quality information, and linear combination coefficient matrix information to the terminal. Here, the linear combination coefficient matrix may be a Galois field matrix. Then, the terminal may receive the control information table from the base station (S610).

Thereafter, the higher layer of the terminal may divide a long-length source block into M transport blocks each having a length transmittable in a pre-allocated radio resource (S620). Here, M may be a natural number. Then, the higher layer of the terminal may deliver the M transport blocks to the physical layer.

The physical layer of the terminal may perform network coding on the M transport blocks to generate (M+$K_N$) network coding blocks (e.g., NCB-1 to NCB-(M+$K_N$)) (S630). In this case, when the S-th network coding block among the (M+$K_N$) network coding blocks is expressed as $Y_S$, it may be expressed as in Equation 1 above. Here, S may be a natural number. The terminal may select a linear combination coefficient matrix based on the number of transport blocks and link quality in the control information table to generate the S-th network coding block. Then, the terminal may generate the S-th network coding block according to Equation 1 by using the M transport blocks and linear combination coefficients of the selected linear combination coefficient matrix.

Thereafter, the physical layer of the terminal may perform FEC coding on each of the network coding blocks to generate network coding blocks to which FEC codes are respectively attached (e.g., coded NCB-1 to coded NCB-(M+$K_N$))) (S640). Here, the FEC code may be an error correction code that enables not only error detection but also error correction by adding a larger number of redundant bits compared to an ARQ scheme. In this case, as the FEC code, a hamming code, a CRC code, a BCH code, or the like may be used.

Then, the physical layer of the terminal may concatenate each CI to each of the coded network coding blocks. Here, each CI may be a control index indicating the linear combination coefficient matrix in Table 1 used when the terminal generates the corresponding network coding block. In addition, after concatenating the CI to each of the coded network coding blocks, the physical layer of the terminal may concatenate each preamble to generate each message (e.g., Msg1 to Msg-(M+$K_N$)) (S650). In this case, the physical layer of the terminal may randomly select a preamble sequence of each preamble.

The physical layer of the terminal may transmit the generated messages to the base station (S660). In this manner, the physical layer of the terminal may transmit the messages (e.g., Msg1 to Msg-(M+$K_N$)) to the base station to attempt (M+$K_N$) GFRA transmissions.

Meanwhile, a reception success probability of each of the M packets to which K repeated transmission scheme of FIG. 4 is applied may be calculated as in Equation 2 below.

$$P_{nc} = \left(1 - \frac{1}{L}\right)^{D-1} \quad \text{[Equation 2]}$$

Here, L may be a preamble length, and D may be the number of terminals attempting random accesses. Meanwhile, when K repeated transmissions are applied, a reception success probability $P_S$ of each of the M packets may be expressed by Equation 3 below.

$$P_S = 1 - (1 - P_{nc})^K \quad \text{[Equation 3]}$$

Therefore, a reception success probability $P_S(M)$ of the M packets to which the K repeated transmissions are applied may be expressed as in Equation 4.

$$P_S(M) = P_S^M = (1-(1-P_{nc})^K)^M \quad \text{[Equation 4]}$$

For performance comparison with GFRA of simple K repeated transmissions, it may be assumed that (M+K$_N$) is K×M in the transmission method of FIG. 5. Then, the reception success probability of the M transport blocks among the K×M network coding blocks may be calculated as follows. First, the probability Pr that the number S of the successfully received network coding blocks among the K×M network coding blocks is greater than or equal to M may be expressed in Equation 5 below. Here, S may be a natural number.

$$Pr(S \geq M) = \sum_{s=M}^{KM} \binom{KM}{s} p_{nc}^s (1-p_{nc})^{KM-s} \quad \text{[Equation 5]}$$

In addition, the probability $P_{ns}(S, M)$ that S transport blocks among the M transport blocks are successfully decoded may be expressed in Equation 6 below.

$$P_{ns}(S,M) = \prod_{j=0}^{M-1}\left(1 - \frac{1}{q^{S-j}}\right) \quad \text{[Equation 6]}$$

Accordingly, the reception success probability $P_S$ of M transport blocks among the K×M network coding blocks to which the network coding is applied may be expressed by Equation 7 below.

$$P_s = \sum_{s=M}^{KM} P_{ns}(S,M) \binom{KM}{s} p_{nc}^s (1-p_{nc})^{KM-s} \quad \text{[Equation 7]}$$

Figure 7:
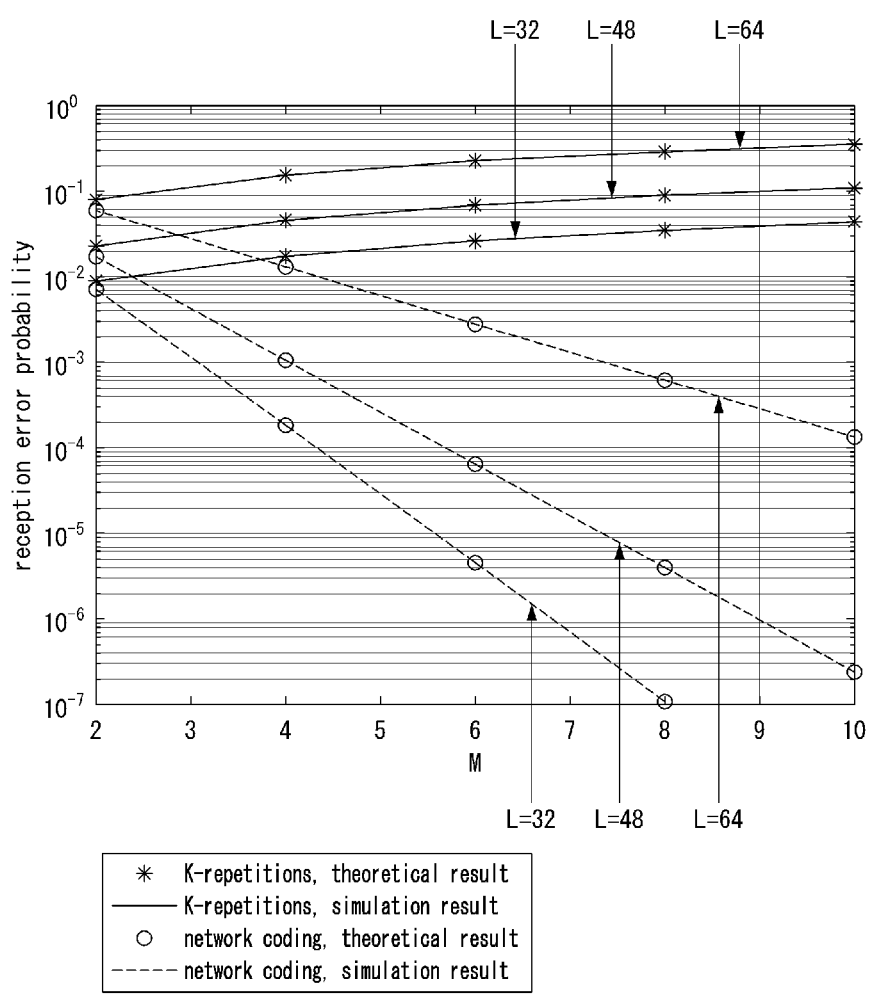
FIG. 7 is a graph for comparing a reception error probability of a random access method to which network coding is applied with a random access method based on conventional K repeated transmissions when the number of packets increases.

FIG. 7 is a graph for comparing a reception error probability of a random access method to which network coding is applied with a random access method based on conventional K repeated transmissions when the number of packets increases.

Referring to FIG. 7, in the case of the random access scheme based on K repeated transmissions, as the number M of divided packets increases, the reception error probability may increase. However, in the case of the random access method to which network coding is applied, the reception error probability may decrease as M increases.

Figure 8:
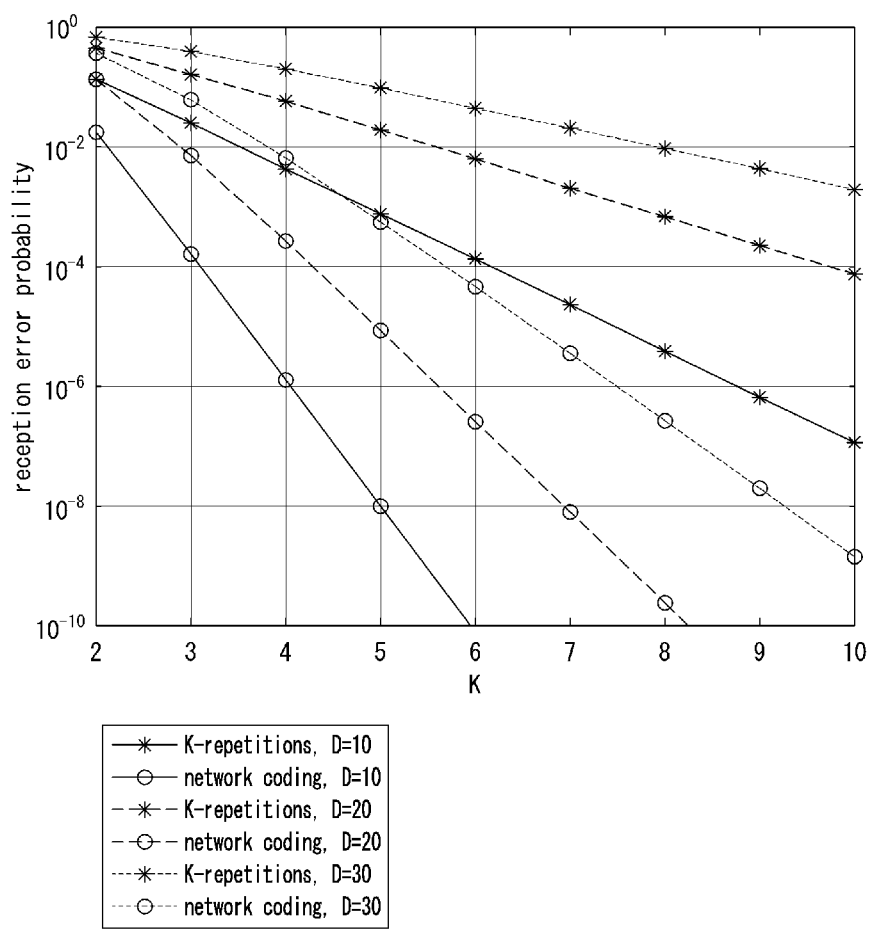
FIG. 8 is a graph for comparing a reception error probability of a random access method to which network coding is applied with a random access scheme based on conventional K repeated transmissions when the number of repetitions increases.

FIG. 8 is a graph for comparing a reception error probability of a random access method to which network coding is applied with a random access scheme based on conventional K repeated transmissions when the number of repetitions increases.

Referring to FIG. 8, as K indicating the number of repeated transmissions increases, the reception error probability may decrease in both the random access method based on K repeated transmissions and the random access method to which network coding is applied. However, the random access method to which network coding is applied may have a greater reduction in the reception error probability according to the increase of K compared to the repeated transmission random access method.

Figure 9:
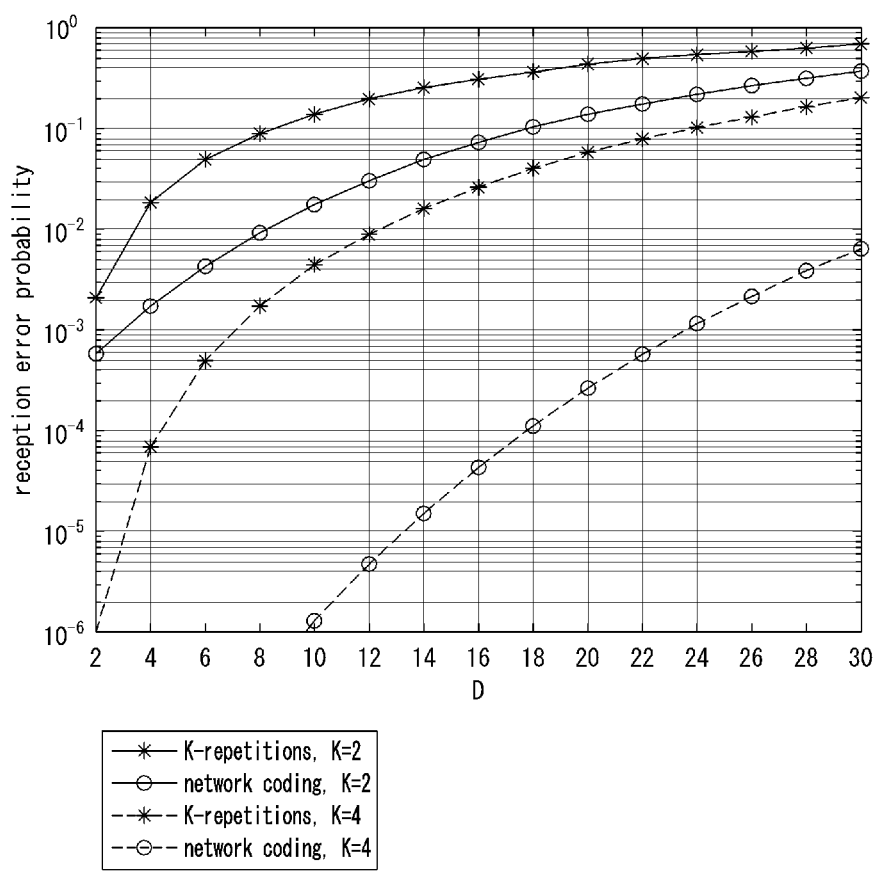
FIG. 9 is a graph for comparing a reception error probability of a random access method to which network coding is applied with a random access method based on conventional K repeated transmissions when the number of terminals increases.

FIG. 9 is a graph for comparing a reception error probability of a random access method to which network coding is applied with a random access method based on conventional K repeated transmissions when the number of terminals increases.

Referring to FIG. 9, as the number D of terminals increases, the reception error probability may increase in both the random access method based on K repeated transmissions and the random access scheme to which network coding is applied. However, the random access method to which network coding is applied may exhibit a lower reception error probability according to the increase in the number of terminals compared to the random access method based on K repeated transmissions.

As such, assuming the same transmission latency as the random access method based on K repeated transmissions in FIG. 4, that is, when (M+K$_N$)=K×M, the random access method to which network coding is applied may obtain higher reliability. In other words, assuming that the random access method based on K repeated transmissions and the random access method to which network coding is applied have the same performance, the random access method to which network coding is applied may further reduce the transmission latency compared to the random access method based on K repeated transmissions. That is, (M+K$_N$)<K×M may be established.

Figure 10:
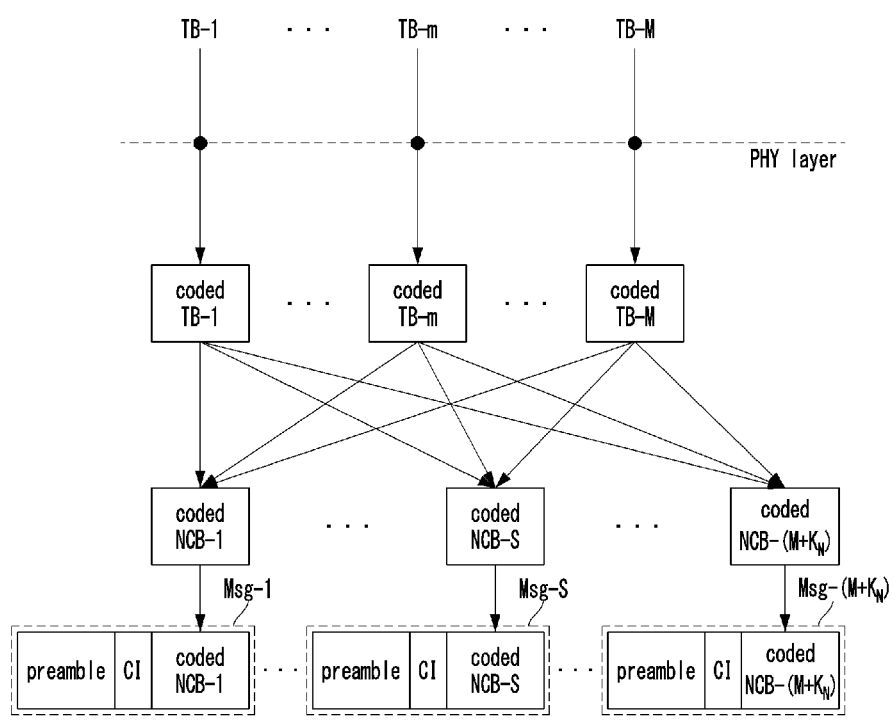
FIG. 10 is a conceptual diagram illustrating a second exemplary embodiment of a data transmission method based on a network coding grant-free random access scheme.

FIG. 10 is a conceptual diagram illustrating a second exemplary embodiment of a data transmission method based on a network coding grant-free random access scheme.

Referring to FIG. 10, in a network coding grant-free random access scheme-based data transmission method, a higher layer of a terminal may divide a long-length source block into M transport blocks (e.g., TB-1 to TB-M) each having a length transmittable in a pre-allocated radio resource. Here, M may be a natural number. Then, the higher layer of the terminal may deliver the M transport blocks to a physical layer.

Meanwhile, the physical layer of the terminal may perform FEC coding on each of the M transport blocks before performing network coding on the M transport blocks, thereby generating the transport blocks to which the FEC codes are respectively attached (hereinafter, referred to as 'coded transport blocks') (e.g., coded TB-1 to coded TB-M). Here, the FEC code may be an error correction code that enables not only error detection but also error correction by adding a larger number of redundant bits compared to the ARQ scheme. In this case, as the FEC code, a Hemming code, a CRC code, a BCH code, etc. may be used.

Meanwhile, the physical layer of the terminal may generate (M+K$_N$) coded network coding blocks (e.g., coded NCB-1 to NCB-(M+K$_N$)) by performing network coding on the M coded transport blocks. Here, K$_N$ may be a natural number. The base station may set the addition value K$_N$ for the terminal through system information or a higher layer message in consideration of a network state, a link quality, and/or the like. In addition, the base station may set an upper limit of the addition value K$_N$ through system information or a higher layer message in consideration of the network state and the link quality.

In this case, the base station may set K$_N$ for the terminal to 0 if the link quality is good. When K$_N$ is set to 0, the terminal may attempt M GFRAs to the base station by using M network coding blocks, which has the same number as the M transport blocks. On the other hand, if the link quality is poor, the base station may set the addition value K$_N$ having a large value to the terminal. As such, if the addition value K$_N$ is set to a large value, the terminal may attempt the GFRA to the base station up to (M+K$_N$) times until the M transport blocks are successfully received at the base station.

When the S-th coded network coding block among the (M+K$_N$) coded network coding blocks is expressed as Y$_S$, it may be as in Equation 1. Here, S may be a natural number.

The physical layer of the terminal may concatenate each CI to each of the coded network coding blocks, and may concatenate each preamble to generate each message (e.g., Msg1 to Msg-(M+$K_N$)). Then, the physical layer of the terminal may transmit the generated messages to the base station. In this case, the physical layer of the terminal may randomly select a preamble sequence for a preamble after concatenating CI to each of the coded network coding blocks. In this manner, the physical layer of the terminal may transmit the messages (e.g., Msg1 to Msg-(M+$K_N$)) to the base station to attempt (M+$K_N$) GFRA transmissions.

In this case, the CI may be a control index in Table 1 indicating the number M of transport blocks that are linearly combined into the coded network coding block, the link quality, and the linear combination coefficient matrix [i.e., $g_1, g_2, \ldots g_M$] used when transmitting the S-th message.

Figure 11:
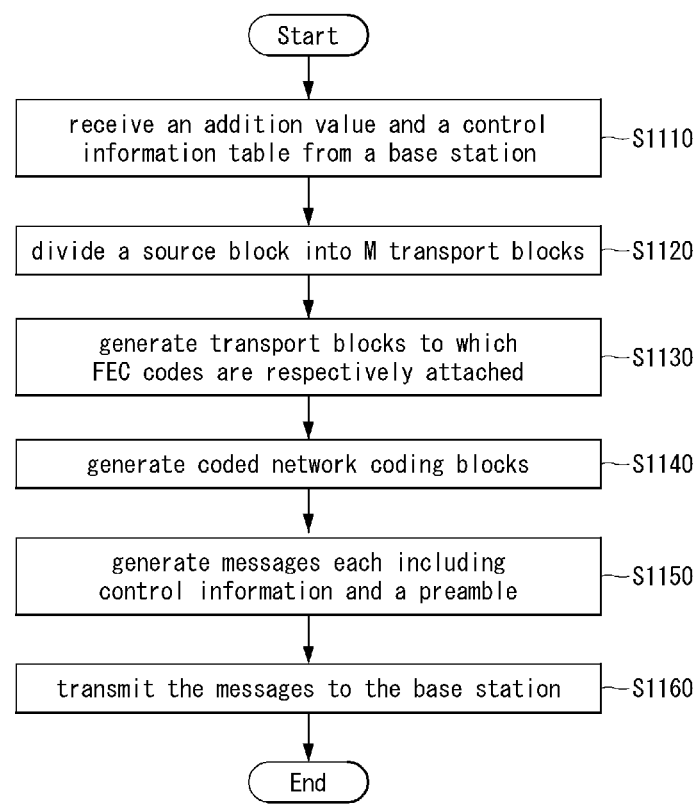
FIG. 11 is a flowchart for describing the second exemplary embodiment of the network coding grant-free random access scheme-based data transmission method.

FIG. 11 is a flowchart for describing the second exemplary embodiment of the network coding grant-free random access scheme-based data transmission method.

Referring to FIG. 11, in the network coding grant-free random access scheme-based data transmission method, the base station may inform the terminal of the addition value $K_N$ for calculating the number of network coding blocks through system information or a higher layer message. Then, the terminal may receive the addition value $K_N$ for calculating the number of network coding blocks from the base station (S1110).

Meanwhile, the base station may transmit the control information table such as Table 1 including control index information, transport block number information, link quality information, and linear combination coefficient matrix information to the terminal. Here, the linear combination coefficient matrix may be a Galois field matrix. Then, the terminal may receive the control information table from the base station (S1110).

Thereafter, the higher layer of the terminal may divide a long-length source block into M transport blocks each having a length transmittable in a pre-allocated radio resource (S1120). Here, M may be a natural number. Then, the higher layer of the terminal may deliver the M transport blocks to the physical layer.

Meanwhile, the physical layer of the terminal may perform FEC coding on each of the M transport blocks before performing network coding on the M transport blocks, thereby generating the transport blocks to which the FEC codes are respectively attached (hereinafter, referred to as 'coded transport blocks') (e.g., coded TB-1 to coded TB-M) (S1130). Here, the FEC code may be an error correction code that enables not only error detection but also error correction by adding a larger number of redundant bits compared to the ARQ scheme. In this case, as the FEC code, a Hemming code, a CRC code, a BCH code, etc. may be used.

Then, the physical layer of the terminal may generate (M+$K_N$) coded network coding blocks (e.g., coded NCB-1 to NCB-(M+$K_N$)) by performing network coding on the M coded transport blocks (S1140). In this case, when the S-th coded network coding block among the (M+$K_N$) coded network coding blocks is expressed as $Y_S$, it may be as in Equation 1. Here, S may be a natural number. The terminal may select a linear combination coefficient matrix based on the number of transport blocks and link quality in the control information table to generate the S-th coded network coding block. Then, the terminal may generate the S-th coded network coding block according to Equation 1 using M coded transport blocks using linear combination coefficients of the selected linear combination coefficient matrix.

Then, the physical layer of the terminal may concatenate each CI to each of the coded network coding blocks. Here, each CI may be a control index indicating the linear combination coefficient matrix in Table 1 used when the terminal generates the corresponding network coding block. In addition, after concatenating the CI to each of the coded network coding blocks, the physical layer of the terminal may concatenate each preamble to generate each message (e.g., Msg1 to Msg-(M+$K_N$)) (S1150). In this case, the physical layer of the terminal may randomly select a preamble sequence of each preamble.

The physical layer of the terminal may transmit the generated messages to the base station (S1160). In this manner, the physical layer of the terminal may transmit the messages (i.e., Msg1 to Msg-(M+$K_N$)) to the base station to attempt (M+$K_N$) GFRA transmissions.

Figure 12:
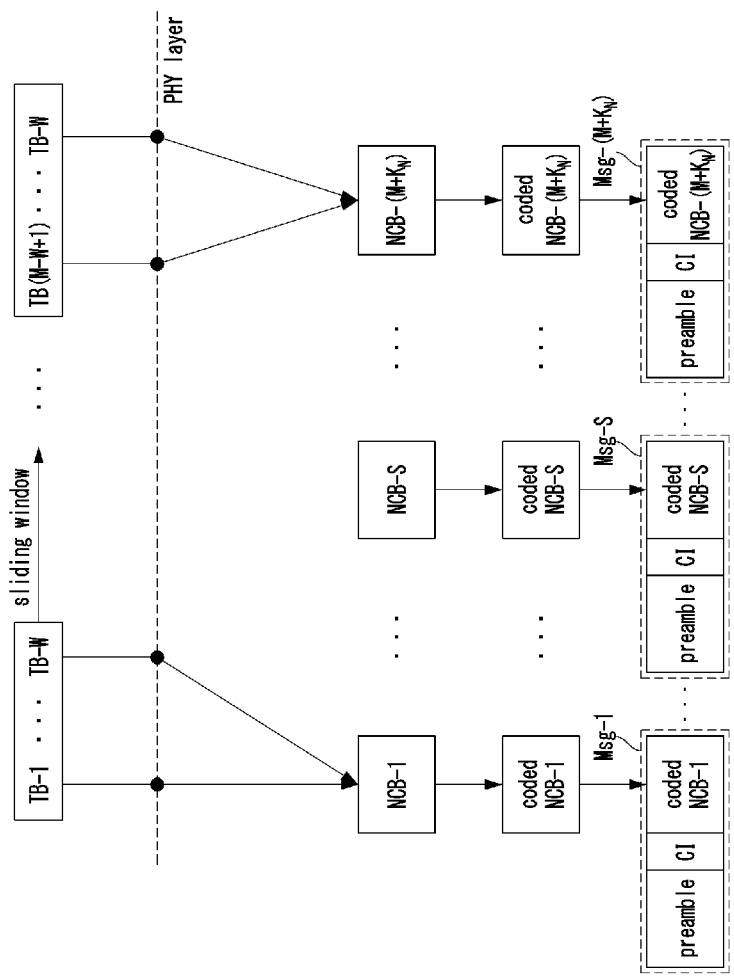
FIG. 12 is a conceptual diagram illustrating a third exemplary embodiment of a data transmission method based on a network coding grant-free random access scheme.

FIG. 12 is a conceptual diagram illustrating a third exemplary embodiment of a data transmission method based on a network coding grant-free random access scheme.

Referring to FIG. 12, in a network coding grant-free random access scheme-based data transmission method, a higher layer of a terminal may divide a long-length source block into M transport blocks (e.g., TB-1 to TB-M) each having a length transmittable in a pre-allocated radio resource. Here, M may be a natural number. In addition, the higher layer of the terminal may sequentially deliver W transport blocks (simply referred to as a 'transport block set') among the M transport blocks to a physical layer by using a sliding window having a size of W. Here, W may be a natural number smaller than M. In this case, the base station may set the size W of the sliding window to the terminal by using system information or a higher layer message.

Looking at this in more detail, the higher layer of the terminal may set a start position of the sliding window to the TB-1. Accordingly, the higher layer of the terminal may deliver a transport block set 1 including the transport blocks TB-1 to TB-W to the physical layer of the terminal by using the sliding window. Then, the higher layer of the terminal may move the start position of the sliding window to the TB-2. Accordingly, the higher layer of the terminal may deliver a transport block set 2 including the transport blocks TB-2 to TB-(W+1) to the physical layer of the terminal by using the sliding window.

Through this process, the higher layer of the terminal may sequentially deliver the transport block sets each comprising W transport blocks among the M transport blocks to the physical layer by using the sliding window. Then, the higher layer of the terminal may finally move the start position of the sliding window to the TB-(M−W+1).

Accordingly, the higher layer of the terminal may finally deliver a transport block set M−W+1 consisting of the transport blocks TB-(M−W+1) to TB-M to the physical layer of the terminal by using the sliding window. As such, the higher layer of the terminal may sequentially deliver (M−W+1) transport block sets to the physical layer of the terminal.

Meanwhile, the physical layer of the terminal may generate (M+$K_N$) network coding blocks (e.g., NCB-1 to NCB-(M+$K_N$)) by performing network coding using the (M−W+1) transport block sets each comprising W transport blocks. Here, $K_N$ may be a natural number. The base station may set the addition value $K_N$ for the terminal through system information or a higher layer message in consideration of a network state, a link quality, and/or the like. In addition, the base station may set an upper limit of the addition value $K_N$ through system information or a higher layer message in consideration of the network state and the link quality.

In this case, the base station may set $K_N$ for the terminal to 0 if the link quality is good. When $K_N$ is set to 0, the terminal may attempt M GFRAs to the base station by using M network coding blocks, which has the same number as the M transport blocks. On the other hand, if the link quality is poor, the base station may set the addition value $K_N$ having a large value to the terminal. As such, if the addition value $K_N$ is set to a large value, the terminal may attempt the GFRA to the base station up to $(M+K_N)$ times until the M transport blocks are successfully received at the base station.

Meanwhile, when the physical layer of the terminal generates a network coding block for each transport block set, $(K_N+W-1)$ network coding blocks may be insufficient. Accordingly, the physical layer of the terminal may additionally generate $(K_N+W-1)$ network coding blocks by using the transport block set M−W+1. To this end, the base station may inform the terminal of a coding table per transport block set comprising a transport block set index, information on constituent transport blocks constituting a transport block set, and the number T of network coding blocks per transport block set so that the terminal generates additional network coding blocks as needed for each transport block set. Here, T may be a natural number. As an example, when M is 8, W is 3, and $K_N$ is 4, the base station may configure a coding table per transport block set as shown in Table 2 below to the terminal so that the terminal generates additional network coding blocks based on a transport block set 6. Accordingly, the physical layer of the terminal may additionally generate six network coding blocks using the transport block set 6 with reference to the coding table per transport block set of Table 2.

TABLE 2

| Transport block set index | Constituent transport blocks | Number T of network coding blocks for each transport block set |
| --- | --- | --- |
| 1 | TB-1 to TB-3 | 1 |
| 2 | TB-2 to TB-4 | 1 |
| 3 | TB-3 to TB-5 | 1 |
| 4 | TB-4 to TB-6 | 1 |
| 5 | TB-5 to TB-7 | 1 |
| 6 | TB-6 to TB-8 | 7 |

Alternatively, the physical layer of the terminal may generate an equal number of additional network coding blocks for each transport block set. To this end, the base station may set the number of network coding blocks T for each transport block set to equally generate additional network coding blocks for each transport block set in the terminal. For example, when M is 8, W is 3, and $K_N$ is 4, the base station may configure a coding table per transport block set as shown in Table 3 below to the terminal. Then, the terminal may generate additional network coding blocks equally for each transport block set with reference to the coding table per transport block set of Table 3.

TABLE 3

| Transport block set index | Constituent transport blocks | Number T of network coding blocks for each transport block set |
| --- | --- | --- |
| 1 | TB-1 to TB-3 | 2 |
| 2 | TB-2 to TB-4 | 2 |
| 3 | TB-3 to TB-5 | 2 |

TABLE 3-continued

| Transport block set index | Constituent transport blocks | Number T of network coding blocks for each transport block set |
| --- | --- | --- |
| 4 | TB-4 to TB-6 | 2 |
| 5 | TB-5 to TB-7 | 2 |
| 6 | TB-6 to TB-8 | 2 |

As another example, the physical layer of the terminal may generate an unequal number of additional network coding blocks for each transport block set to the terminal. To this end, the base station may set the number of network coding blocks T for each transport block set so that terminal generates additional network coding blocks unevenly for each transport block set. For example, when M is 8, W is 3, and $K_N$ is 4, the base station may configure a coding table per transport block set as shown in Table 4 below to the terminal. Then, the terminal may generate additional network coding blocks unevenly for each transport block set with reference to the coding table per transport block set of Table 4.

TABLE 4

| Transport block set index | Constituent transport blocks | Number T of network coding blocks for each transport block set |
| --- | --- | --- |
| 1 | TB-1 to TB-3 | 1 |
| 2 | TB-2 to TB-4 | 3 |
| 3 | TB-3 to TB-5 | 1 |
| 4 | TB-4 to TB-6 | 3 |
| 5 | TB-5 to TB-7 | 1 |
| 6 | TB-6 to TB-8 | 3 |

In addition, the base station may configure the terminal to generate additional network coding blocks using various schemes. Meanwhile, when the SZ-th network coding block among network coding blocks for a transport block set Z is denoted as $Y_{SZ}$, it may be expressed as in Equation 8. Here, Z may be a natural number, and may be defined as $Z \leq M-W+1$. SZ may be a natural number.

$$Y_{SZ} = \sum_{mz=1}^{W} g_{mz} X_{mz}, 1 \leq SZ \leq T \qquad \text{[Equation 8]}$$

Here, $X_{mz}$ may be the m-th transport block in the corresponding transport block set. $g_{mz}$ may be a coefficient applied to the m-th transport block when W transport blocks are linearly combined into the network coding block. $g_{mz}$ may be a value randomly selected from a Galois field GF(q) of a size q. Here, q may be 0 or a positive integer. Here, m may be a natural number.

Meanwhile, the base station may transmit a control information table as shown in Table 5 including control index information, a transport block set index, information on the number of transport blocks, link quality information, and linear combination coefficient matrix information to the terminal. Here, the linear combination coefficient matrix may be a Galois field matrix. In this case, the control information may indicate a control index indicating a transport block set whose transport blocks are linearly combined into a network coding block, the number W of transport blocks, a link quality, and a linear combination coefficient matrix $[g_1 \ g_2 \ \ldots \ g_W]$ used when transmitting the S-th message.

TABLE 5

| Control index | Transport block set index | Number of transport blocks | Link quality | Linear combination coefficient matrix ($[g_1\ g_2\ \ldots\ g_W]$, q = 2) |
|---|---|---|---|---|
| 0 | 1 | W = 2 | Q1 | [1 1] |
| 1 | 1 | W = 2 | Q2 | [1 0] |
| 2 | 1 | W = 2 | Q2 | [0 1] |
| 3 | 1 | W = 3 | Q1 | [1 1 1] |
| 4 | 1 | W = 3 | Q1 | [1 0 1] |
| 5 | 1 | W = 3 | Q1 | [0 1 1] |
| . | . | . | . | . |
| . | . | . | . | . |
| . | . | . | . | . |

Then, the terminal may receive the control information table from the base station. In order to generate the S-th network coding block, the terminal may select a linear combination coefficient matrix based on a transport block set index, the number of transport blocks, and link quality in the control information table. The terminal may generate the S-th network coding block according to Equation 8 with W transport blocks by using linear combination coefficients of the selected linear combination coefficient matrix.

Thereafter, the physical layer of the terminal may perform FEC coding on each of the network coding blocks to generate network coding blocks to which FEC codes are respectively attached (e.g., coded NCB-1 to coded NCB-$(M+K_N)$). Here, the FEC code may be an error correction code that enables not only error detection but also error correction by adding a larger number of redundant bits compared to an ARQ scheme. In this case, as the FEC code, a hamming code, a CRC code, a BCH code, or the like may be used.

Then, after concatenating CI to each of the coded network coding blocks, the physical layer of the terminal may concatenate each preamble to generate each message (e.g., Msg1 to Msg-$(M+K_N)$), and transmit the generated messages to the base station. In this case, the physical layer of the terminal may randomly select a preamble sequence of each preamble. In this manner, the physical layer of the terminal may transmit the messages (e.g., Msg1 to Msg-$(M+K_N)$) to the base station to attempt $(M+K_N)$ GFRA transmissions.

In this case, the control information may indicate a control index indicating a transport block set whose transport blocks are linearly combined into the network coding block, the number W of transport blocks, the link quality, and the linear combination coefficient matrix $[g_1\ g_2\ \ldots\ g_W]$ used when transmitting the S-th message. The terminal may configure messages using the corresponding indexes as the control information. In addition, the terminal may transmit the messages including the corresponding indexes as control information to the base station as described above.

Figure 13:
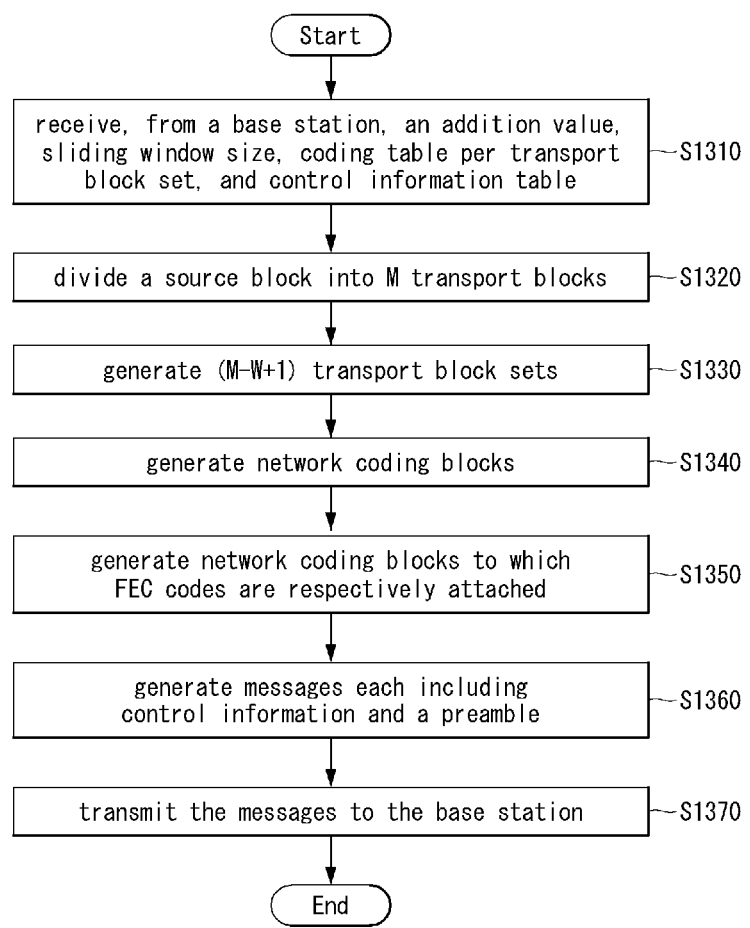
FIG. 13 is a flowchart for describing the third exemplary embodiment of the network coding grant-free random access scheme-based data transmission method.

FIG. 13 is a flowchart for describing the third exemplary embodiment of the network coding grant-free random access scheme-based data transmission method.

Referring to FIG. 13, in the network coding grant-free random access scheme-based data transmission method, the base station may inform the terminal of the addition value $K_N$ for calculating the number of network coding blocks through system information or a higher layer message. Then, the terminal may receive the addition value $K_N$ for calculating the number of network coding blocks from the base station (S1310). In this case, the base station may set an upper limit of the addition value $K_N$ through system information or a higher layer message in consideration of the network state and the link quality. The base station may set $K_N$ for the terminal to 0 if the link quality is good. On the other hand, if the link quality is poor, the base station may set the addition value $K_N$ having a large value to the terminal.

Meanwhile, the base station may inform the terminal of the size W of the sliding window through system information or a higher layer message. Then, the terminal may receive the size W of the sliding window from the base station (S1310). In addition, the base station may inform the terminal of a coding table per transport block set comprising a transport block set index, information on constituent transport blocks constituting a transport block set, and the number T of network coding blocks per transport block set so that the terminal generates additional network coding blocks as needed for each transport block set. Here, T may be a natural number. Then, the terminal may receive the coding table per transport block set from the base station (S1310). In addition, the base station may transmit a control information table including control index information, a transport block set index, information on the number of transport blocks, link quality information, and linear combination coefficient matrix information to the terminal. Then, the terminal may receive the control information table from the base station (S1310).

Thereafter, the higher layer of the terminal may divide a long-length source block into M transport blocks each having a length transmittable in a pre-allocated radio resource (S1320). Here, M may be a natural number. In addition, the higher layer of the terminal may generate (M−W+1) transport block set from the M transport blocks by using the sliding window having the size of W, and sequentially deliver them to the physical layer (S1330). Here, W may be a natural number smaller than M.

Meanwhile, the physical layer of the terminal may generate $(M+K_N)$ network coding blocks (e.g., NCB-1 to NCB-$(M+K_N)$) by performing network coding using the (M−W+1) transport block sets each comprising W transport blocks (S1340). In this case, the physical layer of the terminal may generate the network coding blocks (e.g., NCB-1 to NCB-$(M+K_N)$) by using the transport block sets with reference to the coding table per transport block set. In addition, the terminal may select a linear combination coefficient matrix based on the transport block set index, the number of transport blocks, and the link quality in the control information table to generate the S-th network coding block. In addition, the terminal may generate the S-th network coding block according to Equation 8 with W transport blocks by using linear combination coefficients of the selected linear combination coefficient matrix.

Thereafter, the physical layer of the terminal may perform FEC coding on each of the network coding blocks to generate the network coding blocks to which FEC codes are respectively attached (e.g., coded NCB-1 to coded NCB-$(M+K_N)$) (S1350). Here, the FEC code may be an error correction code that enables not only error detection but also error correction by adding a larger number of redundant bits compared to an ARQ scheme. In this case, as the FEC code, a hamming code, a CRC code, a BCH code, or the like may be used.

Then, after concatenating CI to each of the coded network coding blocks, the physical layer of the terminal may concatenate each preamble to generate each message (e.g., Msg1 to Msg-$(M+K_N)$) (S1360), and transmit the generated messages to the base station. In this case, the physical layer of the terminal may randomly select a preamble sequence of each preamble. In this manner, the physical layer of the terminal may transmit the messages (e.g., Msg1 to Msg-$(M+K_N)$) to the base station to attempt $(M+K_N)$ GFRA transmissions (S1370).

In this case, the control information may indicate a control index indicating a transport block set whose transport blocks are linearly combined into the network coding block, the number W of transport blocks, the link quality, and the linear combination coefficient matrix $[g_1 \ g_2 \ \ldots \ g_W]$ used when transmitting the S-th message. The terminal may configure messages using the corresponding indexes as control information. In addition, the terminal may transmit the messages including the corresponding indexes as control information to the base station as described above.

Figure 14:
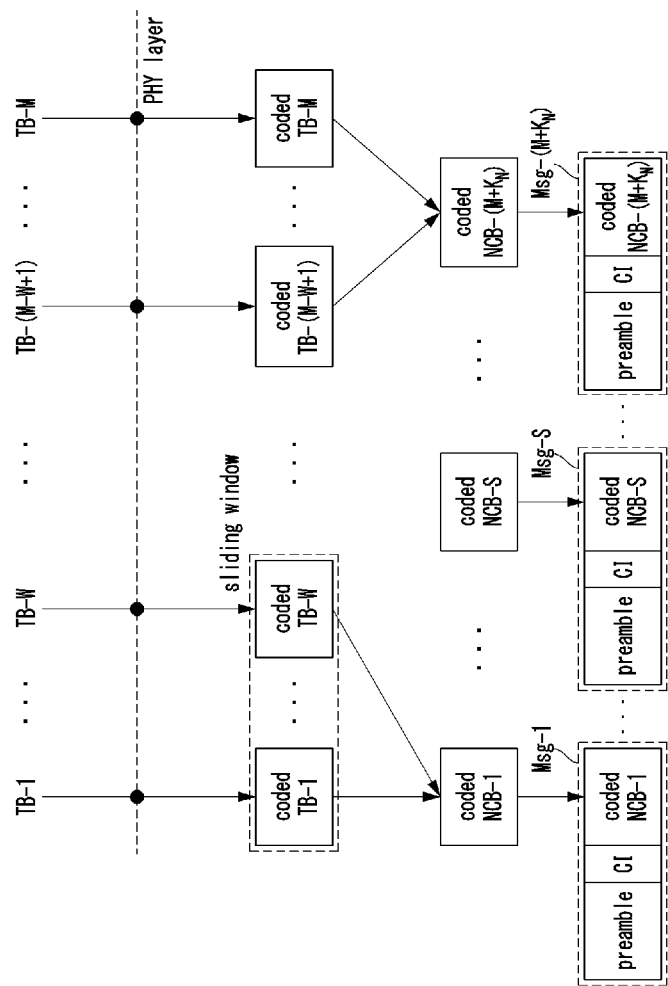
FIG. 14 is a conceptual diagram illustrating a fourth exemplary embodiment of a data transmission method based on a network coding grant-free random access scheme.

FIG. 14 is a conceptual diagram illustrating a fourth exemplary embodiment of a data transmission method based on a network coding grant-free random access scheme.

Referring to FIG. 14, in a network coding grant-free random access scheme-based data transmission method, a higher layer of a terminal may divide a long-length source block into M transport blocks (e.g., TB-1 to TB-M) each having a length transmittable in a pre-allocated radio resource. Here, M may be a natural number.

A physical layer of the terminal may generate coded transport blocks (e.g., coded transport blocks TB-1 to TB-M) to which FEC codes are respectively attached by performing FEC coding on each of the transport blocks before performing network coding on the M transport blocks. Here, the FEC code may be an error correction code that enables not only error detection but also error correction by adding a larger number of redundant bits compared to an ARQ scheme. In this case, as the FEC code, a hamming code, a CRC code, a BCH code, or the like may be used.

Then, the physical layer of the terminal may sequentially select W coded transport blocks from the M coded transport blocks by using a sliding window. Here, W may be a natural number smaller than M. Accordingly, the size of the sliding window may be W.

Looking at this in more detail, the higher layer of the terminal may set a start position of the sliding window to the TB-1. Accordingly, the higher layer of the terminal may deliver a coded transport block set 1 including the coded transport blocks TB-1 to TB-W to the physical layer of the terminal by using the sliding window. Then, the higher layer of the terminal may move the start position of the sliding window to the TB-2. Accordingly, the higher layer of the terminal may deliver a coded transport block set 2 including the coded transport blocks TB-2 to TB-(W+1) to the physical layer of the terminal by using the sliding window. Through this process, the higher layer of the terminal may sequentially deliver the coded transport block sets each comprising W coded transport blocks among the M coded transport blocks to the physical layer by using the sliding window. Then, the higher layer of the terminal may finally move the start position of the sliding window to the TB-(M−W+1). Accordingly, the higher layer of the terminal may finally deliver a coded transport block set M−W+1 consisting of the coded transport blocks TB-(M−W+1) to TB-M to the physical layer of the terminal by using the sliding window. As such, the higher layer of the terminal may sequentially deliver (M−W+1) coded transport block sets to the physical layer of the terminal.

Meanwhile, the physical layer of the terminal may generate $(M+K_N)$ coded network coding blocks (e.g., coded NCB-1 to NCB-$(M+K_N)$) by performing network coding using the (M−W+1) coded transport block sets each comprising W coded transport blocks. Here, $K_N$ may be a natural number. The base station may set the addition value $K_N$ for the terminal through system information or a higher layer message in consideration of a network state, a link quality, and/or the like. In addition, the base station may set an upper limit of the addition value $K_N$ through system information or a higher layer message in consideration of the network state and the link quality.

In this case, the base station may set $K_N$ for the terminal to 0 if the link quality is good. When $K_N$ is set to 0, the terminal may attempt M GFRAs to the base station by using M coded network coding blocks, which has the same number of the M coded transport blocks. On the other hand, if the link quality is poor, the base station may set the addition value $K_N$ having a large value to the terminal. As such, if the addition value $K_N$ is set to a large value, the terminal may attempt the GFRA to the base station up to $(M+K_N)$ times until the M coded transport blocks are successfully received at the base station.

Meanwhile, when the physical layer of the terminal generates a coded network coding block for each coded transport block set, $(K_N+W−1)$ coded network coding blocks may be insufficient. Accordingly, the physical layer of the terminal may additionally generate $(K_N+W−1)$ coded network coding blocks by using the coded transport block set M−W+1. To this end, the base station may inform the terminal of a coding table per transport block set comprising a transport block set index, information on constituent transport blocks constituting a coded transport block set, and the number T of network coding blocks per coded transport block set so that the terminal generates additional network coding blocks as needed for each coded transport block set. Accordingly, the physical layer of the terminal may additionally generate coded network coding blocks using the transport block sets with reference to the coding table per transport block set.

Then, after concatenating CI to each of the coded network coding blocks, the physical layer of the terminal may concatenate each preamble to generate each message (e.g., Msg1 to Msg-$(M+K_N)$), and transmit the generated messages to the base station. In this case, the physical layer of the terminal may randomly select a preamble sequence of each preamble. In this manner, the physical layer of the terminal may transmit the messages (e.g., Msg1 to Msg-$(M+K_N)$) to the base station to attempt $(M+K_N)$ GFRA transmissions.

In this case, the control information may indicate an index indicating a transport block set whose transport blocks are linearly combined into the coded network coding block, the number W of transport blocks, the link quality, and the linear combination coefficient matrix $[g_1 \ g_2 \ \ldots \ g_W]$ used when generating the S-th message. Then, the terminal may transmit the messages including the corresponding indexes as control information to the base station as described above.

Figure 15:
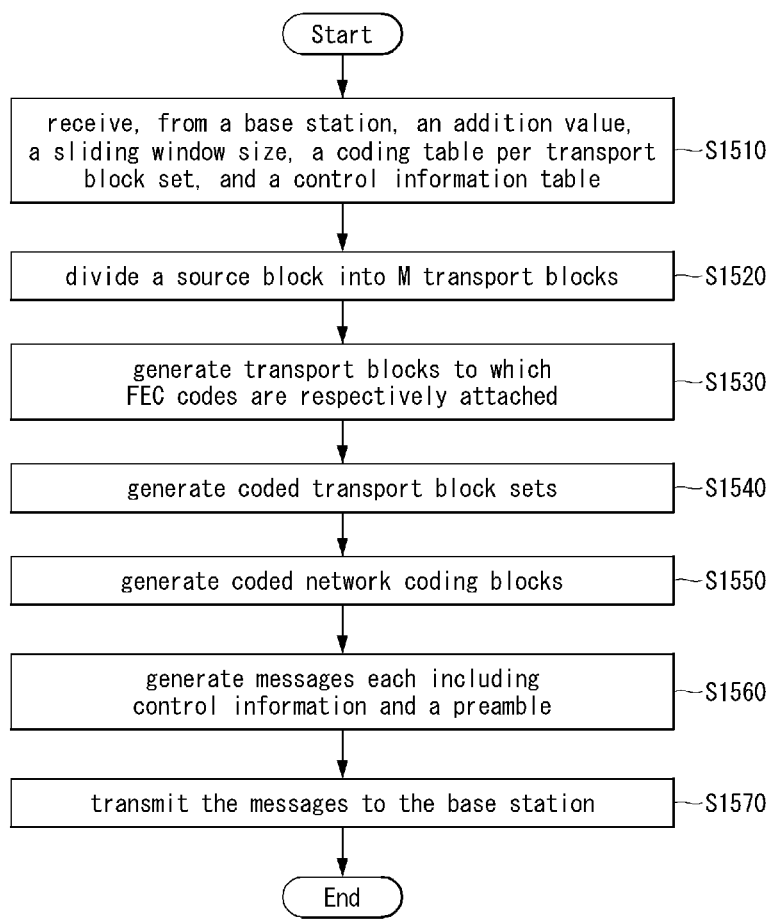
FIG. 15 is a flowchart for describing the fourth exemplary embodiment of the network coding grant-free random access scheme-based data transmission method.

FIG. 15 is a flowchart for describing the fourth exemplary embodiment of the network coding grant-free random access scheme-based data transmission method.

Referring to FIG. 15, in the network coding grant-free random access scheme-based data transmission method, the base station may inform the terminal of the addition value $K_N$ for calculating the number of network coding blocks through system information or a higher layer message. Then, the terminal may receive the addition value $K_N$ for calculating the number of network coding blocks from the base station (S1510). In this case, the base station may set an upper limit of the addition value $K_N$ through system information or a higher layer message in consideration of the network state and the link quality. The base station may set $K_N$ for the terminal to 0 if the link quality is good. On the other hand, if the link quality is poor, the base station may set the addition value $K_N$ having a large value to the terminal.

Meanwhile, the base station may inform the terminal of the size W of the sliding window through system information or a higher layer message. Then, the terminal may receive the size W of the sliding window from the base station (S1510). In addition, the base station may inform the terminal of a coding table per transport block set comprising a transport block set index, information on constituent transport blocks constituting a coded transport block set, and the number T of network coding blocks for each coded transport block set so that the terminal generates additional coded network coding blocks as needed for each coded transport block set. Here, T may be a natural number. Then, the terminal may receive the coding table per transport block set from the base station (S1510). In addition, the base station may transmit a control information table including control index information, a transport block set index, information on the number of transport blocks, link quality information, and linear combination coefficient matrix information to the terminal. Then, the terminal may receive the control information table from the base station (S1510).

Thereafter, the higher layer of the terminal may divide a long-length source block into M transport blocks each having a length transmittable in a pre-allocated radio resource (S1520). Here, M may be a natural number. Then, a physical layer of the terminal may generate coded transport blocks (e.g., coded transport blocks TB-1 to TB-M) to which FEC codes are respectively attached by performing FEC coding on each of the transport blocks (S1530). Here, the FEC code may be an error correction code that enables not only error detection but also error correction by adding a larger number of redundant bits compared to an ARQ scheme. In this case, as the FEC code, a hamming code, a CRC code, a BCH code, or the like may be used.

In addition, the higher layer of the terminal may generate (M−W+1) coded transport block sets from the M transport blocks by using the sliding window having the size of W, and sequentially deliver them to the physical layer (S1540). Here, W may be a natural number smaller than M.

Meanwhile, the physical layer of the terminal may generate (M+$K_N$) coded network coding blocks (e.g., coded NCB-1 to coded NCB-(M+$K_N$)) by performing network coding using the (M−W+1) transport block sets each comprising W coded transport blocks (S1550). In this case, the physical layer of the terminal may generate the coded network coding blocks NCB-1 to NCB-(M+$K_N$) by using the coded transport block transport block sets with reference to the coding table per transport block set. In addition, the terminal may select a linear combination coefficient matrix based on the transport block set index, the number of transport blocks, and the link quality in the control information table to generate the S-th network coding block. In addition, the terminal may generate the S-th coded network coding block according to Equation 8 with W transport blocks by using linear combination coefficients of the selected linear combination coefficient matrix.

Then, after concatenating CI to each of the coded network coding blocks, the physical layer of the terminal may concatenate each preamble to generate each message (e.g., Msg1 to Msg-(M+$K_N$)) (S1560), and transmit the generated messages to the base station. In this case, the physical layer of the terminal may randomly select a preamble sequence of each preamble. In this manner, the physical layer of the terminal may transmit the messages (e.g., Msg1 to Msg-(M+$K_N$)) to the base station to attempt (M+$K_N$) GFRA transmissions (S1570).

Figure 16:
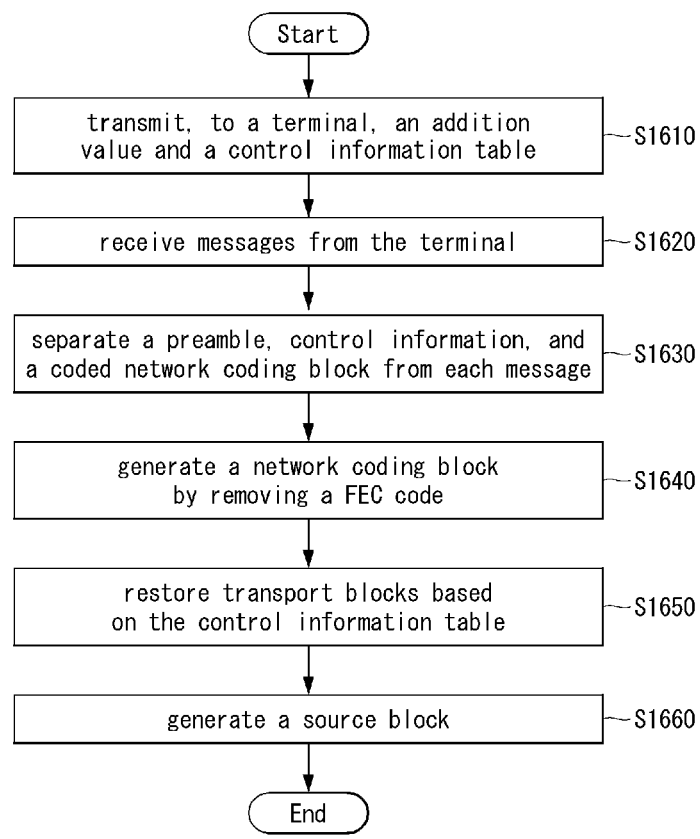
FIG. 16 is a flowchart for describing a first exemplary embodiment of a data reception method based on a network coding grant-free random access scheme.

FIG. 16 is a flowchart for describing a first exemplary embodiment of a data reception method based on a network coding grant-free random access scheme.

Referring to FIG. 16, in a data reception method based on a network coding grant-free random access scheme, a base station may inform a terminal of an addition value $K_N$ for calculating the number of network coding blocks through system information or a higher layer message (S1610). Then, the terminal may receive the addition value $K_N$ for calculating the number of network coding blocks from the base station.

Meanwhile, the base station may transmit a control information table such as Table 1 including control index information, transport block number information, link quality information, and linear combination coefficient matrix information to the terminal (S1610). Here, the linear combination coefficient matrix may be a Galois field matrix. Then, the terminal may receive the control information table from the base station.

Thereafter, the terminal may transmit, to the base station, messages (e.g., Msg1 to Msg-(M+$K_N$)) each including a preamble and control information generated based on the method described with reference to FIGS. 5 and 6. Then, the base station may receive, from the terminal, the messages (e.g., Msg1 to Msg-(M+$K_N$)) each including a preamble and control information generated based on the method described with reference to FIGS. 5 and 6 (S1620).

Thereafter, the base station may separate a preamble, control information, and a coded network coding block from each of the messages (e.g., Msg-1 to Msg-(M+$K_N$)) (S1630). Here, the separated control information may include a control index based on the control information table of Table 1.

Meanwhile, the base station may perform FEC by separating a FEC code for the each separated coded network coding block. Accordingly, the base station may generate network coding blocks from which the FEC codes are separated based on the coded network coding blocks (S1640).

Meanwhile, the base station may restore transport blocks based on Equation 1 and Table 1 by using the network coding blocks and the control indexes of the control information (S1650). Then, the base station may generate a source block by concatenating the transport blocks with each other (S1660). As such, the base station may restore the source block by performing a reverse procedure of the steps of FIGS. 5 and 6, which were performed by the terminal.

Here, although a procedure in which the messages generated by the steps of FIGS. 5 and 6 are received and processed is described, the messages generated by the steps of FIGS. 10 and 11 may be received and processed similarly. Such a procedure may be briefly described as follows. That is, the terminal may transmit messages (e.g., Msg1 to Msg-(M+$K_N$)) each including a preamble and control information, which are generated based on the steps of FIGS. 10 and 11, to the base station. Accordingly, the base station may receive the messages (e.g., Msg1 to Msg-(M+$K_N$)) each including a preamble and control information, which are generated based on the steps of FIGS. 10 and 11, from the terminal.

Thereafter, the base station may separate a preamble, control information, and a coded network coding block from each of the messages Msg-1 to Msg-(M+$K_N$). Meanwhile, the base station may restore the coded transport blocks based on Equation 1 using the coded network coding blocks and the control information. In addition, the base station may perform FEC by separating FEC codes from the coded transport blocks. Accordingly, the base station may generate transport blocks from which the FEC codes are separated based on the coded transport blocks. In addition, the base station may generate a source block by concatenating the transport blocks with each other.

Figure 17:
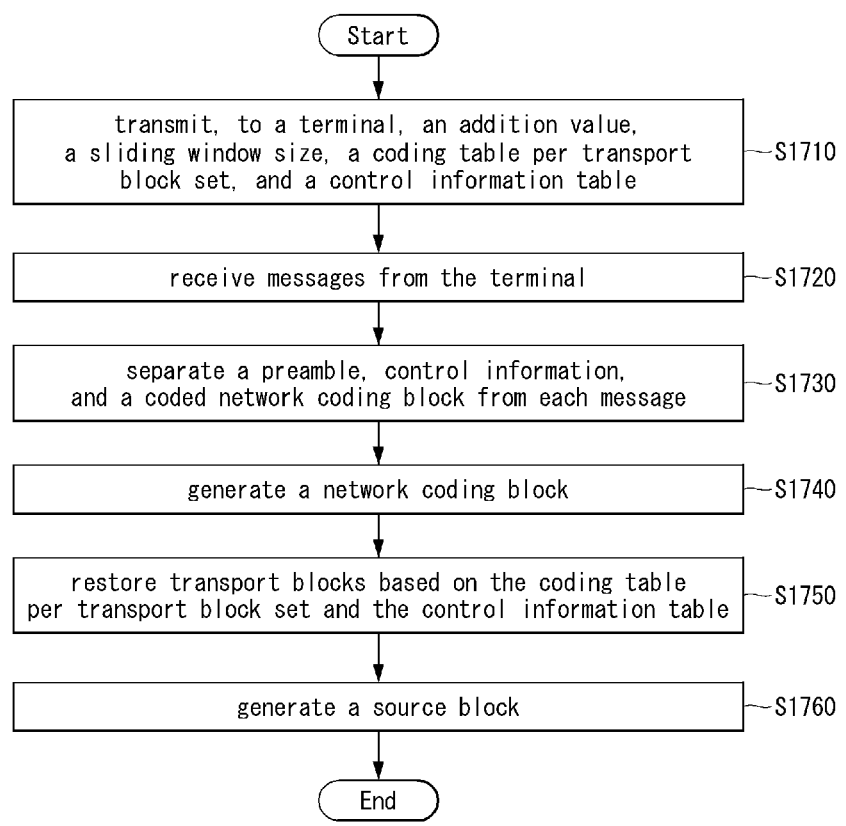
FIG. 17 is a flowchart for describing a second exemplary embodiment of a data reception method based on a network coding grant-free random access scheme.

FIG. 17 is a flowchart for describing a second exemplary embodiment of a data reception method based on a network coding grant-free random access scheme.

Referring to FIG. 17, in a data reception method based on a network coding grant-free random access scheme, a base station may inform a terminal of an addition value $K_N$ for calculating the number of network coding blocks through system information or a higher layer message (S1710). Then, the terminal may receive the addition value $K_N$ for calculating the number of network coding blocks from the base station. Then, the terminal may receive the addition value $K_N$ for calculating the number of network coding blocks from the base station. In this case, the base station may set an upper limit of the addition value $K_N$ through system information or a higher layer message in consideration of a network state, a link quality state, and/or the like. The base station may set $K_N$ for the terminal to 0 if the link quality is good. On the other hand, the base station may set $K_N$ of a large value to the terminal if the link quality is poor.

Meanwhile, the base station may inform the terminal of a size W of a sliding window through system information or a higher layer message (S1710). Then, the terminal may receive the size W of the sliding window from the base station. In addition, the base station may inform the terminal of a coding table per transport block set comprising a transport block set index, information on constituent transport blocks constituting a transport block set, and the number T of network coding blocks so that the terminal generates additional network coding blocks as needed for each transport block set (S1710). Here, T may be a natural number. Then, the terminal may receive the coding table per transport block set from the base station. In addition, the base station may transmit a control information table including control index information, a transport block set index, information on the number of transport blocks, link quality information, and linear combination coefficient matrix information to the terminal (S1710). Then, the terminal may receive the control information table from the base station.

Thereafter, the terminal may transmit messages (e.g., Msg1 to Msg-(M+$K_N$)) each including a preamble and control information, which are generated based on the method described with reference to FIGS. 12 and 13, to the base station. Then, the base station may receive the messages (e.g., Msg1 to Msg-(M+$K_N$)) each including a preamble and control information, which are generated based on the method described with reference to FIGS. 12 and 13, from the terminal (S1720).

Thereafter, the base station may separate the preamble, the control information, and the coded network coding block from each of the messages (e.g., Msg-1 to Msg-(M+$K_N$)) (S1730). Here, the control information may include a control index based on the control information table of Table 5.

Meanwhile, the base station may perform FEC by separating FEC codes from each of the separated coded network coding blocks. Accordingly, the base station may generate network coding blocks from which the FEC codes are separated based on the coded network coding blocks (S1740).

Meanwhile, the base station may restore the transport blocks by using the network coding blocks and the control information based on the coding table per transport block set of Tables 2 to 4, the control information table of Table 5, and Equation 8 (S1750). Then, the base station may generate a source block by concatenating the transport blocks with each other (S1760). As such, the base station may restore the source block by performing a reverse procedure of the steps of FIGS. 12 and 13, which were performed by the terminal.

Here, although a procedure in which the messages generated by the steps of FIGS. 12 and 13 are received and processed is described, the messages generated by the steps of FIGS. 14 and 15 may be received and processed similarly. Such a procedure may be briefly described as follows. That is, the terminal may transmit messages (e.g., Msg1 to Msg-(M+$K_N$)) each including a preamble and control information, which are generated based on the steps of FIGS. 14 and 15, to the base station. Accordingly, the base station may receive the messages (e.g., Msg1 to Msg-(M+$K_N$)) each including a preamble and control information, which are generated based on the steps of FIGS. 14 and 15, from the terminal.

Thereafter, the base station may separate the preamble, the control information, and the coded network coding block from each of the messages (e.g., Msg-1 to Msg-(M+$K_N$)). Here, the control information may include a control index based on the control information table of Table 5.

Meanwhile, the base station may restore the transport blocks by using the coded network coding blocks and the control index, the coding table per transport block set of Tables 2 to 4, the control information table of Table 5, and Equation 8. Then, the base station may perform FEC by separating FEC codes from the coded transport blocks. Accordingly, the base station may generate transport blocks from which the FEC codes are separated based on the coded transport blocks. Then, the base station may generate a source block by concatenating the transport blocks with each other.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal, the operation method comprising:

receiving, from a base station, an addition value $K_N$, information on linear combination coefficient matrices for respective numbers of transport blocks, and configuration information on each linear combination coefficient matrix;
dividing a source block into M transport blocks;
selecting one linear combination coefficient matrix among the linear combination coefficient matrices based on M;
generating $(M+K_N)$ network coding blocks by performing network coding on the M transport blocks with the selected one linear combination coefficient matrix; and
transmitting, to the base station, messages each including one network coding block among the network coding blocks, a control index of the one linear combination coefficient matrix, and a preamble,
wherein each of $K_N$ and M is a natural number.

2. The operation method according to claim 1, further comprising, after the dividing of the source block into M transport blocks,
generating a forward error correction (FEC) code for each of the M transport blocks; and
attaching the FEC code to each of the M transport blocks,
wherein the network cording is performed on the M transport blocks to which the FEC codes are respectively attached.

3. The operation method according to claim 1, further comprising, after the generating of $(M+K_N)$ network coding blocks,
generating an FEC code for each of the $(M+K_N)$ network coding blocks; and
attaching the FEC code to each of the $(M+K_N)$ network coding blocks,
wherein the messages include the one network coding block among the network coding blocks to which the FEC codes are respectively attached.

4. The operation method according to claim 1, wherein an S-th network coding block $Y_S$ among the $(M+K_N)$ network coding blocks is defined as $\sum_{m=1}^{M} g_m X_m$, where $1 \leq S \leq (M+K_N)$, $X_m$ is an m-th transport block among the M transport blocks, and $g_m$ is a linear combination coefficient of a linear combination coefficient matrix applied to the m-th transport block when the M transport blocks are linearly combined into the S-th network coding block.

5. The operation method according to claim 1, further comprising, before the dividing of the source block into M transport blocks, receiving, from the base station, information on a size W of a sliding window, wherein the sliding window is used to generate $(M-W+1)$ transport block sets each comprising W transport blocks among the M transport blocks, and W is a natural number.

6. The operation method according to claim 5, further comprising, after the dividing of the source block into M transport blocks, generating the $(M-W+1)$ transport block sets each comprising the W transport blocks using the slide window for the M transport blocks, wherein the $(M+K_N)$ network coding blocks are generated using the transport block sets.

7. An operation method of a base station, the operation method comprising:
transmitting, to a terminal, an addition value $K_N$, information on linear combination coefficient matrices for respective numbers of transport blocks, and configuration information on each linear combination coefficient matrix;
receiving, from the terminal, messages each including one network coding block among $(M+K_N)$ network coding blocks, a control index of one linear combination coefficient matrix, and a preamble;
generating M transport blocks from the messages by estimating a number of transport blocks and a linear combination coefficient matrix based on the control index; and
generating a source block by concatenating the M transport blocks,
wherein each of $K_N$ and M is a natural number.

8. The operation method according to claim 7, wherein the generating of the M transport blocks comprises:
obtaining respective control indexes and respective network coding blocks from the messages;
estimating respective numbers of transport blocks and respective linear combination coefficient matrixes corresponding to respective network coding blocks from the respective control indexes; and
generating the M transport blocks from the messages by applying the respective number of transport blocks and the respective linear combination coefficient matrixes to the respective network coding blocks.

9. The operation method according to claim 7, further comprising, before the generating of the source block,
obtaining a forward error correction (FEC) code in each of the M transport blocks; and
performing error correction by applying the FEC code to each of the M transport blocks.

10. The operation method according to claim 7, further comprising, after the receiving of the messages,
obtaining an FEC code for the one network coding block; and
performing error correction by applying the FEC code to the one network coding block.

11. The operation method according to claim 7, wherein the addition value $K_N$ is determined according to a link quality.

12. A terminal comprising:
a processor;
a memory electronically communicating with the processor; and
instructions stored in the memory,
wherein when executed by the processor, the instructions cause the terminal to:
receive, from a base station, an addition value $K_N$, information on linear combination coefficient matrices for respective numbers of transport blocks, and configuration information on each linear combination coefficient matrix;
divide a source block into M transport blocks;
select one linear combination coefficient matrix among the linear combination coefficient matrices based on M;
generate $(M+K_N)$ network coding blocks by performing network coding on the M transport blocks with the selected one linear combination coefficient matrix; and
transmit, to the base station, messages each including one network coding block among the network coding blocks, a control index of the one linear combination coefficient matrix, and a preamble,
wherein each of $K_N$ and M is a natural number.

13. The terminal according to claim 12, wherein an S-th network coding block $Y_S$ among the $(M+K_N)$ network coding blocks is defined as $\sum_{m=1}^{M} g_m X_m$, where $1 \leq S \leq (M+K_N)$, $X_m$ is an m-th transport block among the M transport blocks, and $g_m$ is a linear combination coefficient of a linear combination coefficient matrix applied to the m-th transport block when the M transport blocks are linearly combined into the S-th network coding block.

14. The terminal according to claim 12, wherein the instructions further cause the terminal to, before the dividing of the source block into M transport blocks, receive, from the base station, information on a size W of a sliding window, wherein the sliding window is used to generate (M−W+1) transport block sets each comprising W transport blocks among the M transport blocks, and W is a natural number.

15. The terminal according to claim 14, wherein the instructions further cause the terminal to, after the dividing of the source block into M transport blocks, generate the (M−W+1) transport block sets each comprising the W transport blocks using the slide window for the M transport blocks, wherein the $(M+K_N)$ network coding blocks are generated using the transport block sets.

* * * * *